United States Patent [19]

Benn et al.

[11] Patent Number: 5,734,740
[45] Date of Patent: Mar. 31, 1998

[54] METHOD FOR AUTOMATED RADIOGRAPHIC QUALITY ASSURANCE

[75] Inventors: Douglas K. Benn; Minbo Shim, both of Gainesville, Fla.

[73] Assignee: University of Florida, Gainesville, Fla.

[21] Appl. No.: 332,513

[22] Filed: Oct. 31, 1994

[51] Int. Cl.$^6$ .................................................. G06K 9/00
[52] U.S. Cl. ............................................ 382/132; 382/168
[58] Field of Search .................................... 382/132, 133, 382/168–172, 142–144, 149, 150; 378/207; 364/413.13, 413.14

[56] References Cited

U.S. PATENT DOCUMENTS

| | | | |
|---|---|---|---|
| 4,239,395 | 12/1980 | Modisette | 356/443 |
| 4,453,226 | 6/1984 | Hobbs et al. | 364/555 |
| 4,467,351 | 8/1984 | Wang | 358/111 |
| 4,550,422 | 10/1985 | Van Pelt et al. | 378/207 |
| 4,896,278 | 1/1990 | Grove | 364/552 |
| 4,950,894 | 8/1990 | Hara et al. | 250/327.2 |
| 5,077,768 | 12/1991 | Shigyo et al. | 378/98 |
| 5,157,455 | 10/1992 | Macri et al. | 356/243 |
| 5,218,625 | 6/1993 | Heidsieck | 378/97 |
| 5,224,177 | 6/1993 | Doi et al. | 382/168 |
| 5,225,979 | 7/1993 | Feldman et al. | 364/413.13 |
| 5,297,550 | 3/1994 | Margosian | 382/128 |
| 5,369,572 | 11/1994 | Haraki et al. | 382/132 |
| 5,450,502 | 9/1995 | Eschbach et al. | 382/169 |
| 5,537,483 | 7/1996 | Stapleton et al. | 382/168 |

*Primary Examiner*—Yon J. Couso
*Attorney, Agent, or Firm*—Kerkam, Stowell, Kondracki & Clarke; Dennis P. Clarke

[57] ABSTRACT

A method for quantitatively evaluating the quality of radiographic films is disclosed. The method provides for digitizing a radiographic image to form a digital image made up of a plurality of pixels. The individual pixels of the digitized image are assigned grey level values. These grey level values are summed to form a global histogram representing all of the pixels of the digital image. The histogram is subsequently binned and subdivided to form first and second binned histograms. A series of rules is applied to these histograms to evaluate whether the radiographic film is clinically acceptable for use in making a diagnosis.

7 Claims, 5 Drawing Sheets

METHOD FOR AUTOMATED RADIOGRAPHIC QUALITY ASSURANCE

FIELD OF THE INVENTION

The present invention relates to a method of providing quality assurance for radiographic films. In particular, the invention discloses an automated method for quantitatively evaluating the quality of radiographic films without using expensive skilled labor.

BACKGROUND OF THE INVENTION

In view of the ever escalating costs in the health care arena, it is desirable to cut costs and eliminate overhead expense wherever possible. This is increasingly difficult because many of the duties that are performed in the health care industry require the use of highly trained, skilled and expensive labor. It is, therefore, desirable to explore automation of certain processes where quantitative measurements and judgments can be made in an automated system without compromising the quality of health care services provided. One such area is quality assurance of radiographic films, such as, for example those used in dental radiography.

Dental radiography consumes approximately 4% of total dental expenditure in the United States, yet regular systematic office quality assurance of radiographic films is not generally performed. Conventionally, the evaluation of film faults in radiographic films, for example, those films used to produce dental radiographs, i.e., X-rays, involves the use of expensive and well-trained personnel making subjective judgments of film quality.

In order to properly diagnose what is contained in radiographic images, the quality of the image must meet certain clinical requirements. If the radiograph is too light or too dark, the possibility of misdiagnosis due to the inability to detect various problems is increased. Therefore, it is desirable, before the radiograph is analyzed, that it be evaluated for quality assurance. Performing radiographic quality assurance assessments should, therefore, be encouraged, while not performing this assessment for cost reasons should be discouraged.

Because there has been no objective method for judging correctness of this normally subjective evaluation of film quality, it has been difficult to lower the costs of assessing the quality of radiographic films without compromising the diagnostic efficacy of such films.

SUMMARY OF THE INVENTION

In view of the foregoing, what is needed is a reliable, efficient, automated system for quantitatively evaluating the quality of radiographic films without requiring the use of highly skilled and expensive labor.

Therefore, it is an object of the present invention to provide a computer implemented method for providing automated quality evaluation of radiographic images.

It is another object of the present invention to reduce the costs associated with subjective evaluation of radiographic film quality associated with specialized and expensive labor, thus encouraging the performance of radiographic quality assurance and improving diagnostic reliability.

Another object of the present invention is to develop a set of rules that can be used to evaluate radiographic film quality in an automated environment.

In order to overcome the deficiencies of the present system and to accomplish the objects set forth above, an automated method for determining quality of a radiographic image is provided, comprising the steps of: digitizing a radiographic image to form a digital image of the radiographic image, wherein the digitized image comprises a plurality of pixels; storing the digital image in a memory; generating a grey level histogram of the digital image, wherein each pixel is assigned a grey level value; and determining a quality classification of the radiographic image based on applying a set of predetermined rules to the grey level histogram of the digital image.

Performing the method in accordance with the present invention provides a quantitative evaluation of radiographic film quality. Therefore, the need for highly trained and expensive labor to make an assessment of radiographic film quality is obviated.

Because subjective evaluations, by their nature, cannot be entirely consistent, it is difficult to compare results and make efficient judgments. Automating and quantifying the evaluation process will provide more consistent and accurate results as compared to performing a subjective evaluation.

Another feature of the present invention is the application of rules to the histograms generated by processing the digitized image of the radiographic film. Once a histogram has been generated, a series of empirically developed rules, which serve to provide a classification scheme with respect to the quality of the radiographic film, are applied to the histogram in order to make a determination of the radiographic film quality. These rules remain constant and lead to consistent and accurate results. Moreover, the automated application of these rules to the radiographic films eliminates the need for highly skilled and expensive labor in the evaluation process.

Another feature of the present invention which improves efficiency, reduces computer resources and improves the quality of the analysis, is binning of the grey level histogram. Binning involves dividing the grey levels assigned to the pixels of the digitized image into a predetermined number of different ranges, summing the numbers of pixels in each range and providing a binned histogram reflecting the relative percentages of pixels falling within each grey level value range.

Using binning provides advantages with respect to computer resources and is especially useful when evaluating dental radiographs. Global histograms may be unacceptable in evaluating films having only a few teeth or extensive restorations because these films may contain large dark or light areas that could skew the grey level distribution. Therefore, separating an image into a number of independent images and binning each of these smaller images reduces the skewing effect and provides much improved, consistent and reliable results.

A further refinement of the method involves further subdividing particular regions of a binned histogram. In this embodiment, further study of particular areas of the radiographic film can be enhanced and the probability of erroneous results reduced.

The rules applied to the grey level histograms were arrived at through empirical evaluation of films and adjustment of various rules criteria. It is understood that, for different applications, different rules may be generated and used to evaluate the quality of radiographic films.

BRIEF DESCRIPTION OF THE DRAWINGS

The invention will be described in detail below with reference to the following figures in which like reference numerals refer to like elements, and wherein.

DETAILED DESCRIPTION OF PREFERRED EMBODIMENTS

Figure 1:
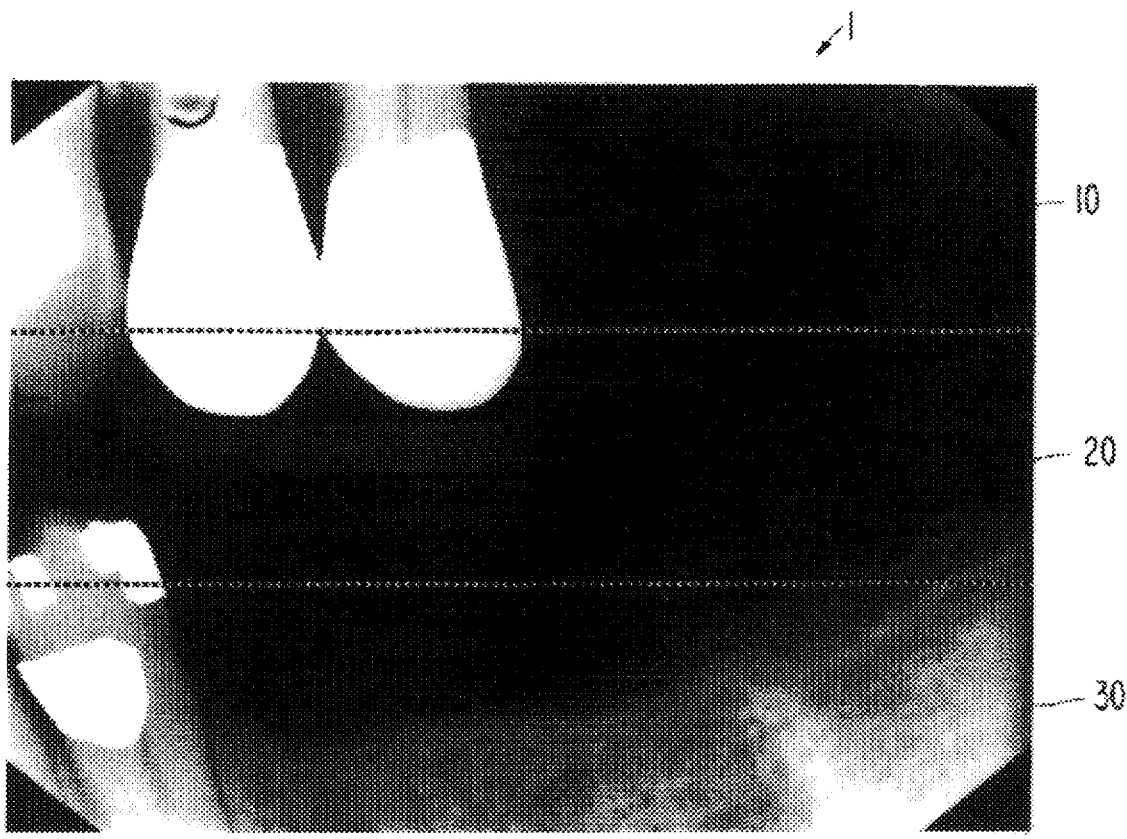
FIG. 1 is an illustration of a dental radiograph to be evaluated.

FIG. 1 shows a typical dental radiograph 1 having light, dark and intermediate exposure areas. The light and intermediate areas generally represent bone, teeth, tissue, restorations, and the like, while the dark areas generally indicate space or over-exposed regions of the film.

Prior evaluations of such films were purely subjective and were made by highly trained and costly personnel. Therefore, in order to eliminate the need for expensive and subjective evaluations, the present invention was developed. In the present invention, the exposed radiographic film is processed by an evaluation system that quantitatively analyzes the film and indicates whether the film is acceptable for use in diagnosis.

Figure 5:
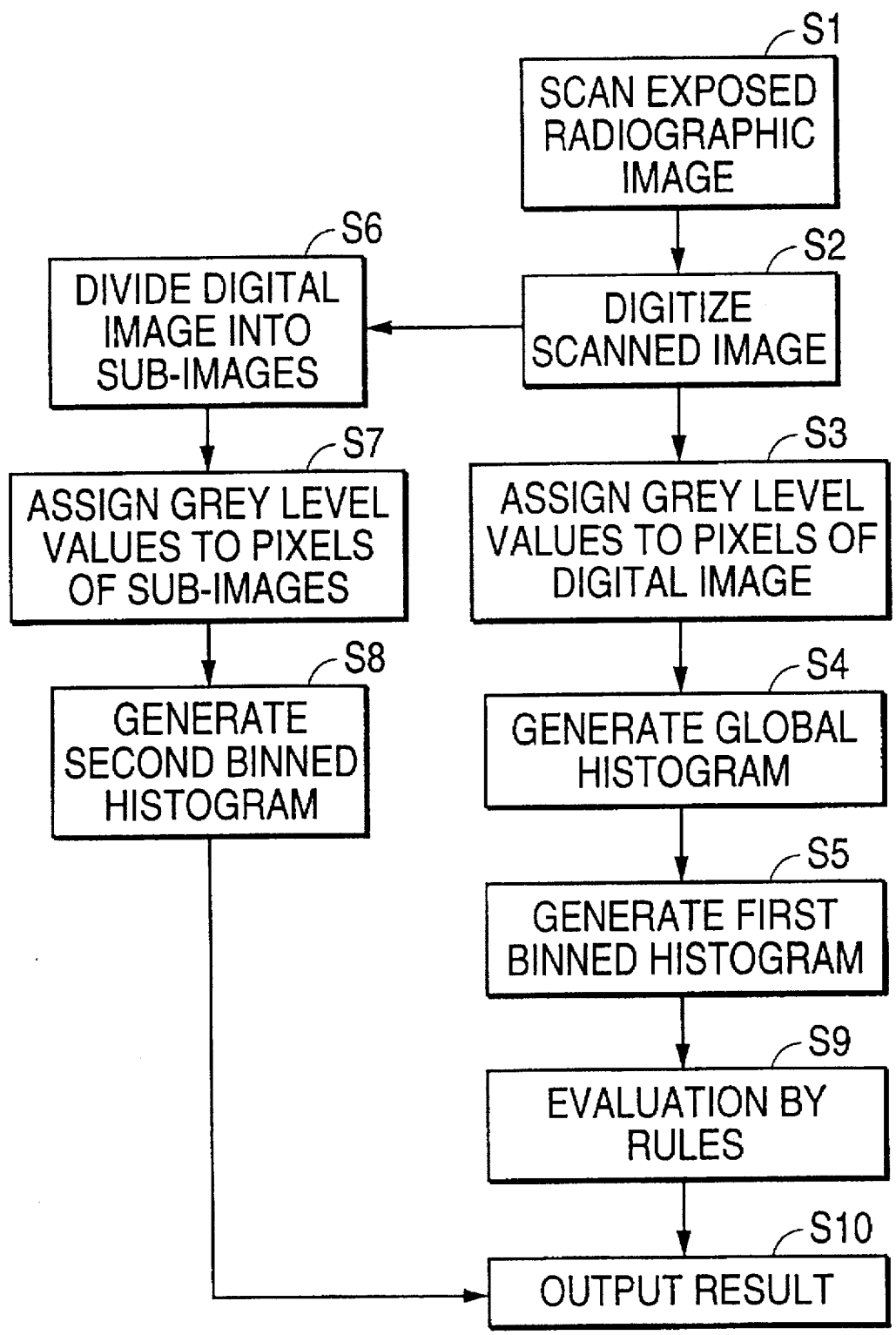
FIG. 5 is a flow chart showing an overview of the method of the present invention.

In accordance with the present method, as generally shown in FIG. 5, radiograph 1 (FIG. 1) is scanned to form a digital image equivalent of the exposed radiographic film, comprising a plurality of pixels. An acceptable scanning system used in this method could be, for example, a charge coupled device (CCD) video camera, the output of which is connected to a digitizer or, preferably, a scanner, such as the COOLSCAN™ System from Nikon, Inc. When scanning the film using the COOLSCAN™ System, a calibrating film is first scanned by the system to set an appropriate baseline. Once the system is calibrated, it is ready to receive a film for scanning. An exposed film is inserted, scanned by the system and stored as a digital image. Scanning a film in this manner does not damage or otherwise alter the original exposed film.

Figure 2:
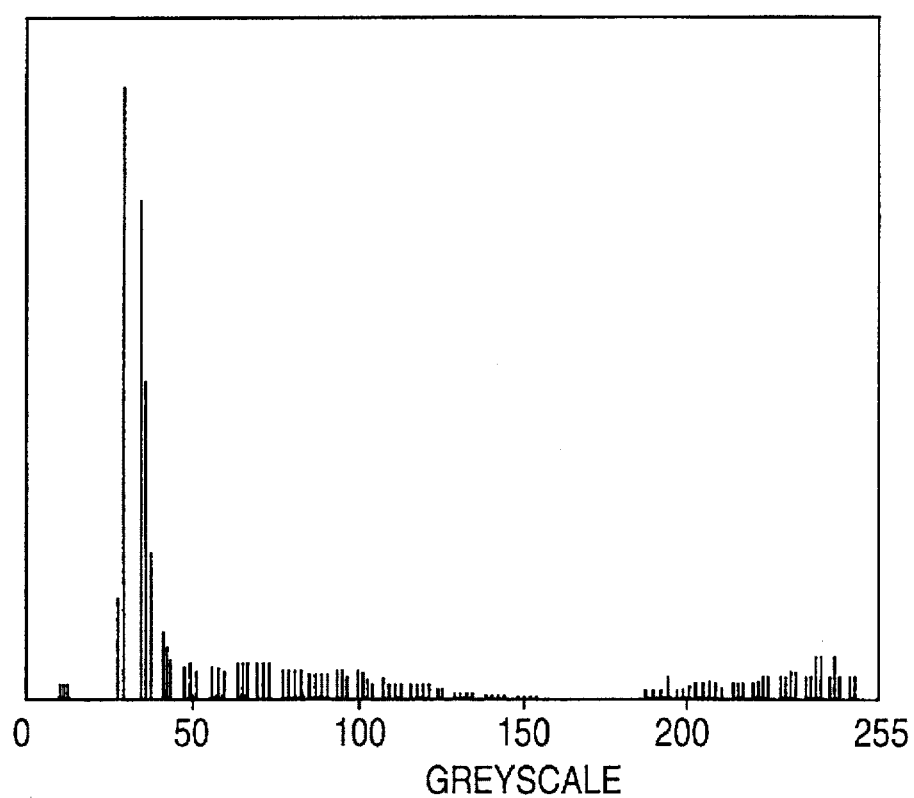
FIG. 2 is a global histogram of the dental radiograph of FIG. 1, representing various grey levels present in the radiograph.

The scanned image is further processed by a computer system such as, for example, a SUN SPARC 2 Workstation from Sun Microsystems, Inc., of Mountain View, Calif. The digital image of the film is made up of a plurality of pixels. Each of the pixels is assigned a grey level value in a range of values such as, for example, a range of 0 to 255, with 0 being the darkest grey level value and 255 being the lightest grey level value. It is understood that any grey level assignment scheme can be used so long as an acceptable grey level distinction and distribution can be achieved. The number of pixels representing each given grey level value from 0 to 255 is then quantified and can be represented as a histogram. A histogram representing every pixel and every grey level value is called a "global histogram." A global histogram, representing the radiograph 1 shown in FIG. 1, is shown in FIG. 2. It is readily apparent from the global histogram that the radiograph 1 shown in FIG. 1 has a greater proportion of dark areas to light areas.

However, using a global histogram presents many problems when attempting to automatically judge the quality of clinical radiographic films. For example, in dental radiography, dark areas may occur if the subject is missing teeth. The gaps normally occupied by teeth would be represented by dark areas on the film. In addition, if a significant amount of metal restorations exist in a particular subject, excessive light readings may occur. Therefore, when using global histograms, subjects having missing teeth, excessive metal restorations, or the like, could skew the grey level distribution, resulting in an improper analysis and mischaracterization of the quality of the film.

Figure 3:
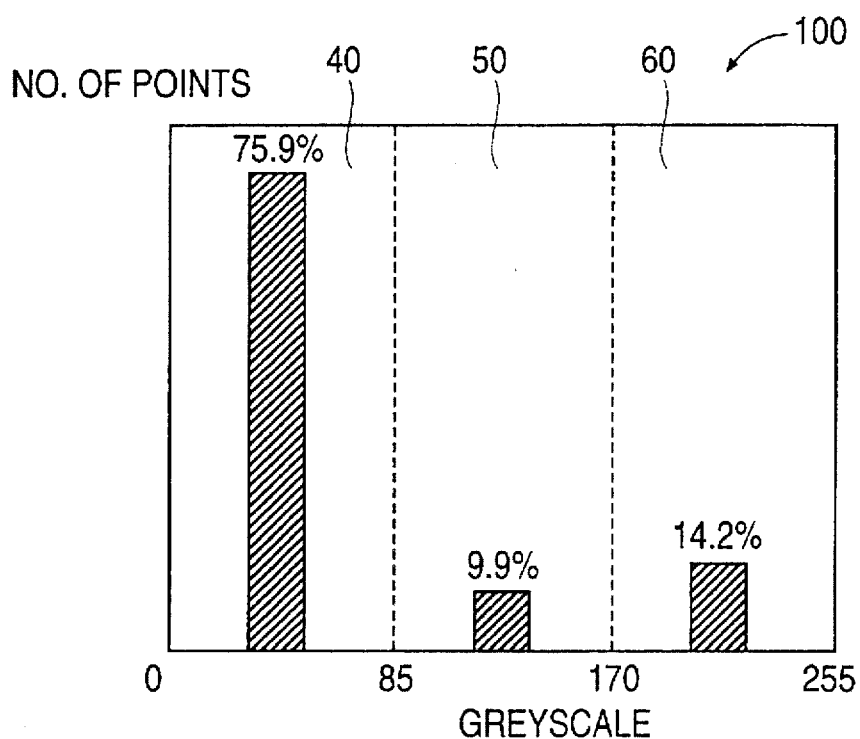
FIG. 3 is a binned histogram of the radiograph of FIG. 1 and the global histogram shown in FIG. 2.

In order to simplify the characterization of a grey level histogram, a technique called "binning" may be used. In binning, the grey level domain is subdivided into ranges chosen by the system designer. For example, the grey level domain could be divided into three ranges: a dark range, an intermediate range and a light range. It will be understood that any number of ranges and allocation of grey levels to the selected ranges may be used. In the present exemplary embodiment, three ranges are chosen to define the grey level domain. The ranges are: (i) a dark range representing grey level values from 0 to 85; (ii) an intermediate range representing grey level values from 86 to 170; and (iii) a light range representing grey level values from 171 to 255. A binned histogram is formed by adding the number of pixels falling into a particular range and determining what percentage of the total number of pixels fall into each defined range. A binned histogram of the radiograph 1 shown in FIG. 1 and the global histogram shown in FIG. 2 is shown in FIG. 3. In this particular example, the percentage of pixels in the selected dark range of 0 to 85 grey levels 40 is 75.9%, the percentage of pixels in the selected intermediate range of 86 to 170 grey levels 50 is 9.9% and the percentage of pixels in the selected light range 60 of 171 to 255 is 14.2%. Using binning is advantageous in improving discrimination between global histograms and is processed more efficiently by computer resources.

However, it is has been found that while binning histograms avoids some of the adverse results and processing disadvantages realized using global histograms, the results achieved using binned histograms may be further refined by subdividing the film 1 into smaller regions and analyzing binned histograms of each of these smaller regions to provide a more accurate and consistent diagnostic acceptability determination.

Figure 4:
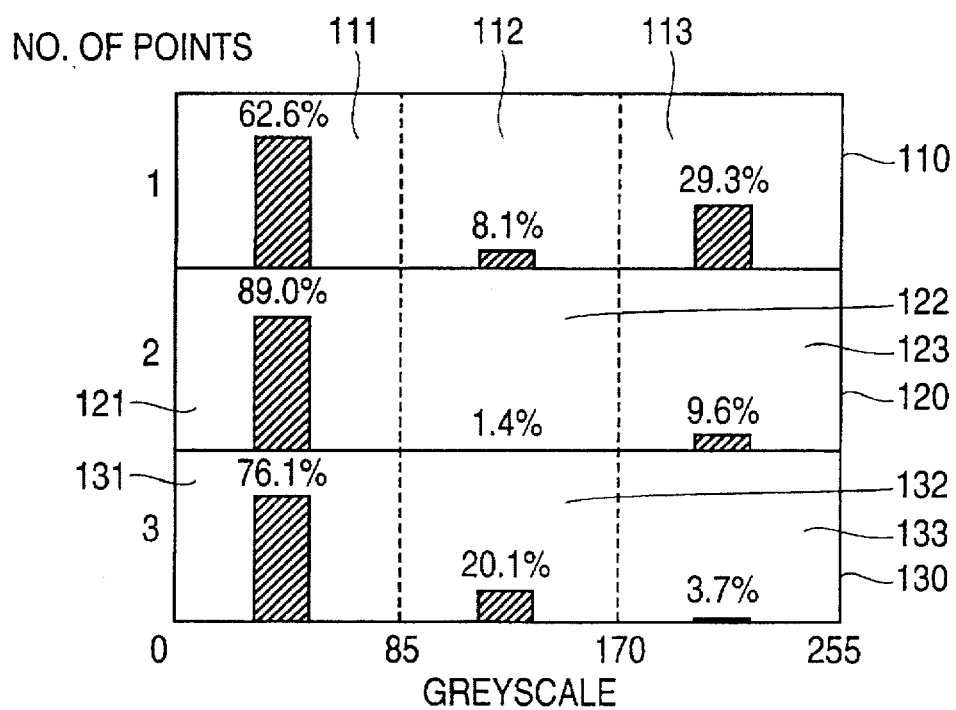
FIG. 4 shows binned histograms for three independent regions of the radiograph shown in FIG. 1.

In the example shown in the figures, the film 1 shown in FIG. 1 is divided into three regions 10, 20, 30. A binned histogram for each of these regions is then generated as shown in FIG. 4. By creating binned histograms for each of these regions, the skewing effect is reduced and the probability of incorrect evaluation is decreased. However, it is noted that a binned histogram of the overall film, as shown in FIG. 3, is still useful in making a preliminary determination of film quality as set forth below. If, from the preliminary evaluation, it is determined that further analysis is required, the second binned histogram, as shown in FIG. 4, may be used to further refine the evaluation.

Specifically, a number of rules for evaluating film quality of radiographic films has been developed based on empirical subjective evaluation. The subjective evaluations were analyzed, and rules for quantitatively determining film quality developed. It should be understood that these rules may be modified and refined to improve results, so long as the overall evaluation method remains the same.

The overall method is generally set forth in FIG. 5. The radiographic film 1 is scanned S1 and digitized S2 by a suitable scanning and digitizing system such as, for example, the COOLSCAN™ System by Nikon, Inc. The pixels of the digitized image are then assigned relative grey level values S3 by a suitable computer system such as, for example, the SUN SPARC 2 Workstation by Sun Microsystems, Inc., based on their relative darkness and lightness. The global histogram is then generated S4 by summing the number of pixels having particular grey level values. A global histogram is then binned S5, as described above, to create a binned histogram representing percentages of pixels in a predetermined range of grey levels. In the present example, three grey level ranges are chosen as set forth above. In addition, the digitized image is further divided into a number of non-overlapping regions S6. In this particular example, three independent regions 10, 20, 30 (FIG. 1) were chosen. The pixels making up the independent regions are assigned grey level values S7 and each region is individually binned S8 to form a second binned histogram made up of binned histograms of each of the selected regions 10, 20, 30. In the present example, three regions were chosen for evaluation; however, any number of regions may be defined. When all histograms have been generated, they are evaluated S9 by a set of rules which, in this case, were generated by evaluating empirical subjective judgments of trained personnel and comparing these judgments to the histograms generated. Once the evaluation is completed, the result is output S10. This result is then evaluated by the diagnostician for further action.

Figure 6:
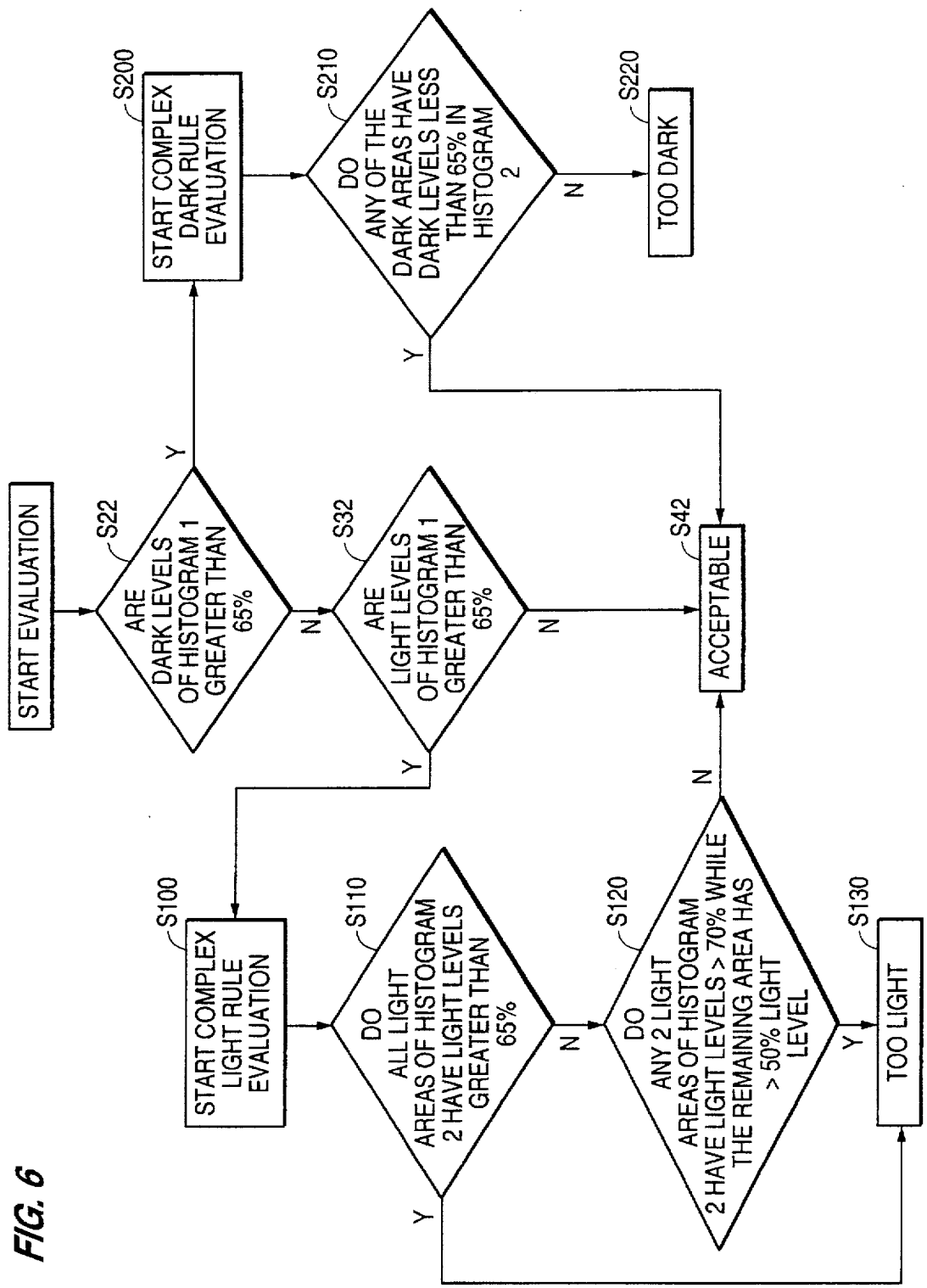
FIG. 6 is a flow chart showing how rules are applied to the histograms to evaluate radiographic film quality.

The rules generated and applied to evaluate film quality in the present invention were developed using subjective evaluations of films as a basis. It was found that acceptable results were obtained when the rules set forth below were applied to the histograms generated as described above. A flow chart showing exemplary rules and their application is shown in FIG. 6.

The first binned histogram 100, shown in FIG. 3, is used to make an initial determination as to whether further evaluation is necessary. This preliminary evaluation is called the "first rule." The first rule is implemented in step S22 of the flow chart shown in FIG. 6.

Before discussing the rules in greater detail, a number of parameters must be defined. Hist1 represents the first binned histogram 100 shown in FIG. 3. Hist1[0] represents the dark portion of the image 40 shown in FIG. 3. Hist1[1] represents the intermediate range 50 shown in FIG. 3, and hist1[2] represents the light range 60 shown in FIG. 3. Hist2 represents the second binned histogram 200 for the three independent regions as shown in FIG. 4. Hist2[0][0], hist2[0][1] and hist2[O][2] represent the dark 111, intermediate 112 and light 113 ranges of the first region 110 of the histogram 200, respectively. Likewise, hist2[1][0], hist2[1][1] and hist2[1][2] represent the dark 121, intermediate 122 and light 123 ranges of the second region 120 in the histogram 200. Finally, hist2[2][0], hist2[2][1] and hist2[2][2] represent the dark 131, intermediate 132 and light 133 ranges of the third region 130 of the histogram 200.

Once the first histogram 100 and second histogram 200 have been defined, the selected rules may be applied thereto. It was found, through empirical analysis, that an initial analysis using only the first histogram 100, shown in FIG. 3, can be conducted. If certain criteria are met in this initial analysis, subsequent analysis may not be required. If, however, the first histogram falls within certain other rule-based parameters, more complex dark and light rules, as shown in FIG. 6, may be applied to the second histogram 200 shown in FIG. 4.

Specifically, it was found that a first rule applied to the first histogram 100 could be used to determine acceptability if certain criteria were met. The first rule generally states: if the percentage of the pixels in the dark range 40 of the histogram 100 is greater than 65%, then a complex dark rule would be applied to the second histogram 200 to determine whether the film is acceptable. If, on the other hand, the percentage of pixels in the light range 60 of the first histogram 100 is greater than 65%, the acceptability of the film will be determined based on a complex light rule. If neither of these conditions exist, then the film will be judged acceptable and no further analysis would be necessary. This series of rules is shown in steps S22, S32, S42 in FIG. 6, respectively.

The first rule S22, S32, S42 can be logically expressed as follows:

```
IF hist1[0] > 65%
THEN
    check Complex Dark Rule
ELSE IF hist1[2] > 65%
THEN
    check Complex Light Rule
ELSE
    film is ACCEPTABLE.
```

If the film does not qualify as acceptable based on the initial quality evaluation, the complex light rule S100, S110, S120, S130, S42 or complex dark rule S200, S210, S220, S42 are applied to the second histogram 200. These complex rules are defined herein.

The complex dark rule S200, S210, S220, S42 basically states that if the percentage of pixels in any one of the three dark regions 111, 121, 131 in histogram 200 is less than 65%, the film will be evaluated as acceptable. This will remain true even if the dark region in the global histogram case is classified as too dark. The logical expression for this rule is:

```
IF (hist2[0][0] < 65% OR hist2[1][0] < 65%
    OR hist2[2][0] < 65%)
THEN
    film is ACCEPTABLE
ELSE
    film is TOO DARK.
```

The complex light rule S100, S110, S120, S130, S42, applied to the light regions 113, 123, 133 of the second histogram 200, is somewhat more involved. Basically, the complex light rule states that if the percentage of pixels in all three light regions 113, 123, 133 are greater than 65%, the film is evaluated as being too light. In addition, if the percentage of pixels in any two of the three light regions 113, 123, 133 is greater than 70% and the remaining light region has a percentage of pixels greater than 50%, the film will also be evaluated as too light. If neither of the two light conditions are met, then the film is evaluated as acceptable. The rule is logically expressed as follows:

```
IF (hist2[0][2] > 65% AND hist2[1][2] > 65%
    AND hist2[2][2] > 65%)
THEN
    film is TOO LIGHT
ELSE IF (
    (hist2[0][2] > 70% AND hist2[1][2] > 70%
        AND hist2[2][2] > 50%) OR
    (hist2[0][2] > 70% AND hist2[2][2] > 70%
        AND hist2[1][2] > 50%) OR
```

```
(hist2[1][2] > 70% AND hist2[2][2] > 70%
     AND hist2[0][2] > 50%))
THEN
     film is TOO LIGHT
ELSE
     film is ACCEPTABLE
ELSE
     film is ACCEPTABLE.
```

Application of the above rules to the histograms 100, 200 generated from the digitized radiographic image produces a highly reliable quantitative evaluation of radiographic films allowing the practitioner to know whether a particular film is diagnostically acceptable.

Another way to fine tune this evaluation would be to further subdivide individual regions of the second histogram to form another histogram to which subsequently developed rules can be applied. For example, the dark region hist2[0][0] 111 could be further divided into, for example, three to nine regions to fine tune the dark film evaluation. Similarly, light regions could also be further manipulated to further fine tune the evaluation of radiographic films. It will be understood that complex rules for evaluating these subdivided histograms would also need to be developed.

While this invention has been described in connection with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as defined above and in the following claims.

What is claimed:

1. A computer implemented method for determining film density quality of a clinical radiographic image on an exposed radiographic film comprising the steps of:

exposing a radiographic film to form a radiographic image;

digitizing said radiographic image to form a digital image of said radiographic image, said digital image comprising a plurality of pixels;

storing said digital image in a memory;

assigning a grey level value to each of said plurality of pixels based on a relative darkness of each said pixel;

generating a grey level histogram of said digital image based on said assigned grey level values;

storing said grey level histogram in a memory;

generating at least one binned grey level histogram of said digital image based on said assigned grey level values;

storing said at least one binned grey level histogram in a memory; and determining a quality classification of said radiographic image based on an evaluation of said binned grey level histogram of said digital image; wherein the step of generating said at least one binned grey level histogram comprises retrieving said grey level histogram from memory;

summing a number of pixels of said digital image having grey level values in a first range, said first range being defined as a dark range;

summing a number of pixels of said digital image having grey level values in a second range, said second range being defined as an intermediate range;

summing a number of pixels of said digital image having grey level values in a third range, said third range being defined as a light range;

said first binned histogram reflecting relative percentages of the numbers of pixels of the digital images in each of said first, second and third ranges; and storing said first binned histogram in a memory.

2. The method of claim 1, wherein said grey level values are in the range of 0 to 255, 0 being a darkest grey level and 255 being a lightest grey level.

3. The method of claim 1, comprising the further steps of:

retrieving said digital image from memory;

dividing said digital image into three regions, each region being approximately one-third of the digital image and each of the three regions being independent of each other;

assigning grey level values to each of said plurality of pixels;

generating a grey level histogram for each of said three independent regions; and storing said grey level histogram of each said three independent regions in a memory.

4. The method of claim 3, further comprising the step of binning the grey level histograms of each of the three regions to form a second binned grey level histogram comprising a binned grey level histogram for each said region, wherein the step of binning comprises:

retrieving said grey level histogram for each said three independent regions from said memory;

summing a number of pixels of a given region of said digital image having grey level values in said first range;

summing a number of pixels in a given region of said digital image having grey level values in said second range;

summing a number of pixels in a given region of said digital image having grey level values in said third range;

repeating said summing steps for each of said three independent regions;

generating a second binned histogram for each said region, wherein said binned histogram reflects relative percentages of said first, second and third ranges in each region; and storing said second binned histogram in a memory.

5. The method of claim 4 wherein said step of determining quality classification of said radiographic image comprises:

retrieving said first and second binned histograms from memory;

comparing the relative percentage of said first, second and third ranges in said first binned histogram and comparing the relative percentages of said first, second and third ranges in each of the three regions of said second binned histogram in accordance with predetermined rules, said rules comprising at least one of a first rule, a complex dark rule and a complex light rule; and determining the quality classification based on a result of applying said predetermined rules to said binned histogram.

6. The method of claim 5, wherein applying said rules comprises:

applying said first rule to said first binned histogram, said first rule comprising:

classifying the quality of said radiographic image as acceptable when a percentage of pixels in said first range is less than 65% and a percentage of pixels in said third range is less than 65%;

applying said complex dark rule to said second binned histogram to determine if the quality of said radiographic image is acceptable or too dark when a percentage of pixels of said first binned histogram in said first range is greater than 65% in each region, said complex dark rule comprising:

classifying the quality of said radiographic image as acceptable if the percentage of pixels in the first range is less than 65% in any of the three regions;

classifying the quality of the radiographic image as too dark if the percentage of pixels in the first range is not less than 65% in each of the three regions; and applying said complex light rule to said second binned histogram to determine if the quality of said radiographic image is acceptable or too light when the percentage of pixels in the third range of said first binned histogram is greater than 65%, said complex light rule comprising:

classifying the quality of the radiographic image as too light when the percentage of pixels in the third range is greater than 65% in all three regions;

classifying the quality of the radiographic image as too light when the percentage of pixels in the third range is greater than 70% in two of the three regions and greater than 50% in a remaining region; and classifying the quality of the radiographic image as acceptable if it has not been determined to be too light.

7. The method of claim 1, wherein:

said first range is defined as a range of grey level values from 0 to 85;

said second range is defined as a range of grey level values from 86 to 170; and said third range is defined as a range of grey level values from 171 to 255.

* * * * *